US008458334B2

(12) United States Patent  (10) Patent No.: US 8,458,334 B2
Sukthankar et al.  (45) Date of Patent: Jun. 4, 2013

(54) OPTIMIZED CAPACITY PLANNING

(75) Inventors: Vijay K. Sukthankar, Bangalore (IN); Pradipta K. Banerjee, Bangalore (IN); Swarna L. Mylavarapu, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 494 days.

(21) Appl. No.: 12/704,063

(22) Filed: Feb. 11, 2010

(65) Prior Publication Data

US 2011/0196908 A1  Aug. 11, 2011

(51) Int. Cl.
*G06F 11/00* (2006.01)
(52) U.S. Cl.
USPC .......... 709/226; 709/223; 709/224; 718/104; 718/102; 718/100
(58) Field of Classification Search
USPC .................. 709/201, 226, 223, 224; 718/100, 718/102, 104, 105
See application file for complete search history.

(56) References Cited

U.S. PATENT DOCUMENTS

| | | | |
|---|---|---|---|
| 7,356,602 B2 | 4/2008 | Goldszmidt et al. | |
| 2005/0097560 A1 | 5/2005 | Rolia et al. | |
| 2005/0165925 A1 | 7/2005 | Dan et al. | |
| 2008/0028409 A1 | 1/2008 | Cherkasova et al. | |
| 2008/0228459 A1 | 9/2008 | Jiang et al. | |
| 2008/0271039 A1 | 10/2008 | Rolia et al. | |
| 2010/0325281 A1* | 12/2010 | Li et al. .................. | 709/226 |
| 2011/0202925 A1* | 8/2011 | Banerjee et al. .......... | 718/104 |

OTHER PUBLICATIONS

Heo et al. "Memory Overbooking and Dynamic Control of Xen Virtual Machines in Consolidated Environments" http://www.eecs.umich.edu/~ppadala/pubs/IM2009.pdf.
Gmach et al.; "Capacity Management and Demand Prediction for Next Generation Data Centers"; www3.in.tum.de/research/publications/conferences/icws2007.pdf.
Daniel Vatov, "A Software System for Optimal Virtualization of a Server Farm", Institute of Information Technologies, Sofia, 2009, pp. 25-33.
Jacques Sauve et al., "SLA Design from a Business Perspective", Universidade Federal de Campina Grande, Brazil, IFIP International Federation for Information Processing 2005, pp. 73-84.
Padala, P., Zhu, X., et. al. "Automated control of multiple virtualized resources", Proceedings of the 4th ACM European Conference on Computer Systems 2009, pp. 1-16.

(Continued)

*Primary Examiner* — Kenneth R Coulter
(74) *Attorney, Agent, or Firm* — Law Office of Jim Boice (57) ABSTRACT

A computer implemented method, system and/or program product determine capacity planning of resources by utilizing a stochastic analysis of application workloads. Average workloads, which describe past resource utilization, of each of multiple applications are computed. A random sequence of the multiple applications is encoded into a first generation chromosome. The first generation chromosome is executed using a set of computing resources in a resource cloud. In response to execution of the first generation chromosome on the set of computing resources meeting a predetermined service level agreement (SLA) for the first generation chromosome, the first generation chromosome is scored in accordance with how many computing resources within the set of computing resources are utilized in order to meet the predetermined SLA. Next generation chromosomes, derived from the first generation chromosome, are executed and scored until an optimal chromosome, which utilizes the fewest computing resources, is identified and deployed.

20 Claims, 3 Drawing Sheets

OTHER PUBLICATIONS

Hyser, C., et. al, "Autonomic Virtual Machine Placement in a Data Center", Technical Report, Dec. 11, 2007, pp. 1-10, HPL-2007-189.

Gupta, R., et. al. "A Two Stage Heuristic Algorithm for Solving the Server Consolidation Problem with Item-Item and Bin-Item Incompatibility Constraints", 2008 IEEE International Conference on Services Computing, pp. 39-46 (Abstract Only).

Ajiro, Y. and Atsuhiro, T., "Improving packing Algorithms for Server Consolidation", Conference CMG 2007, 1-8.

Padala, P., Zhu, X., et. al. "Performance Evaluation of Virtualization Technologies for Server Consolidation", HP Laboratories Palo Alto, 2005, pp. 1-14.

Rolia, J., Cherkasova, L., and Andrzejak, A., "A Capacity Management Service for Resource Pools", Proceedings of the 5th International Workshop on Software and performance. Jan. 4, 2005, pp. 1-15.

H. Wada et al., "Queuing Theoretic and Evolutionary Deployment Optimization With Probabilistic SLAS for Service Oriented Clouds," Proceedings of the 2009 IEEE World Congress on Services, Jul. 6, 2009, pp. 661-669.

D. Gmach, "Chapter 3: Metrics for Capacity Management," From Managing Shared Resource Pools for Enterprise Applications, Mar. 27, 2009, pp. 21-29.

D. Gmach, "Chapter 5: Workload Placement Management" From Managing Shared Resource Pools for Enterprise Applications, Mar. 27, 2009, pp. 45-56.

S. Rosario et al., "Flexible Probabilistic QOS Management of Transaction Based Web Services Orchestrations," Proceedings of the 2009 IEEE International Conference on Web Services, Jul. 6, 2009, pp. 107-114.

D. Marinescu, "Chapter 2: Background" From Design and Evaluation of Self-Management Approaches for Virtual Machine-Based Environments, Feb. 29, 2008, pp. 5-36.

D. Marinescu, "Chapter 3: Analysis" From Design and Evaluation of Self-Management Approaches for Virtual Machine-Based Environments, Feb. 29, 2008, pp. 37-57.

S. Agrawal et al., "Grouping Genetic Algorithm for Solving the Server Consolidation Problem With Conflicts," Proceedings of the First ACM/SIGEVO Summit on Genetic and Evolutionary Computation, Jun. 12, 2009.

H. Nakada et al., "Toward Virtual Machine Packing Optimization Based on Genetic Algorithm," Lecture Notes in Computer Science, vol. 5518, Jun. 6, 2009, pp. 651-654.

International Searching Authority, International Search Report and Written Opinion for International Application No. PCT/EP2011/051887, Apr. 8, 2011.

P. Campegiani, "A Genetic Algorithm to Solve the Virtual Machines Resources Allocation Problem in Multi-Tier Distributed Systems," Proceedings of the 2nd International Workshop on Virtualization Performance: Analysis, Characterization, and Tools, Apr. 26, 2009.

\* cited by examiner

OPTIMIZED CAPACITY PLANNING

BACKGROUND

The present disclosure relates to the field of computers, and specifically to computer resources. Still more particularly, the present disclosure relates to allocating computer resources.

BRIEF SUMMARY

A computer implemented method, system and/or program product determine capacity planning of resources by utilizing a stochastic analysis of application workloads. Average workloads, which describe past resource utilization, of each of multiple applications are computed. A random sequence of the multiple applications is encoded into a first generation chromosome. The first generation chromosome is executed using a set of computing resources in a resource cloud. In response to execution of the first generation chromosome on the set of computing resources meeting a predetermined service level agreement (SLA) for the first generation chromosome, the first generation chromosome is scored in accordance with how many computing resources within the set of computing resources are utilized in order to meet the predetermined SLA. Next generation chromosomes, derived from the first generation chromosome, are executed and scored until an optimal chromosome, which utilizes the fewest computing resources, is identified and deployed.

DETAILED DESCRIPTION

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Figure 1:
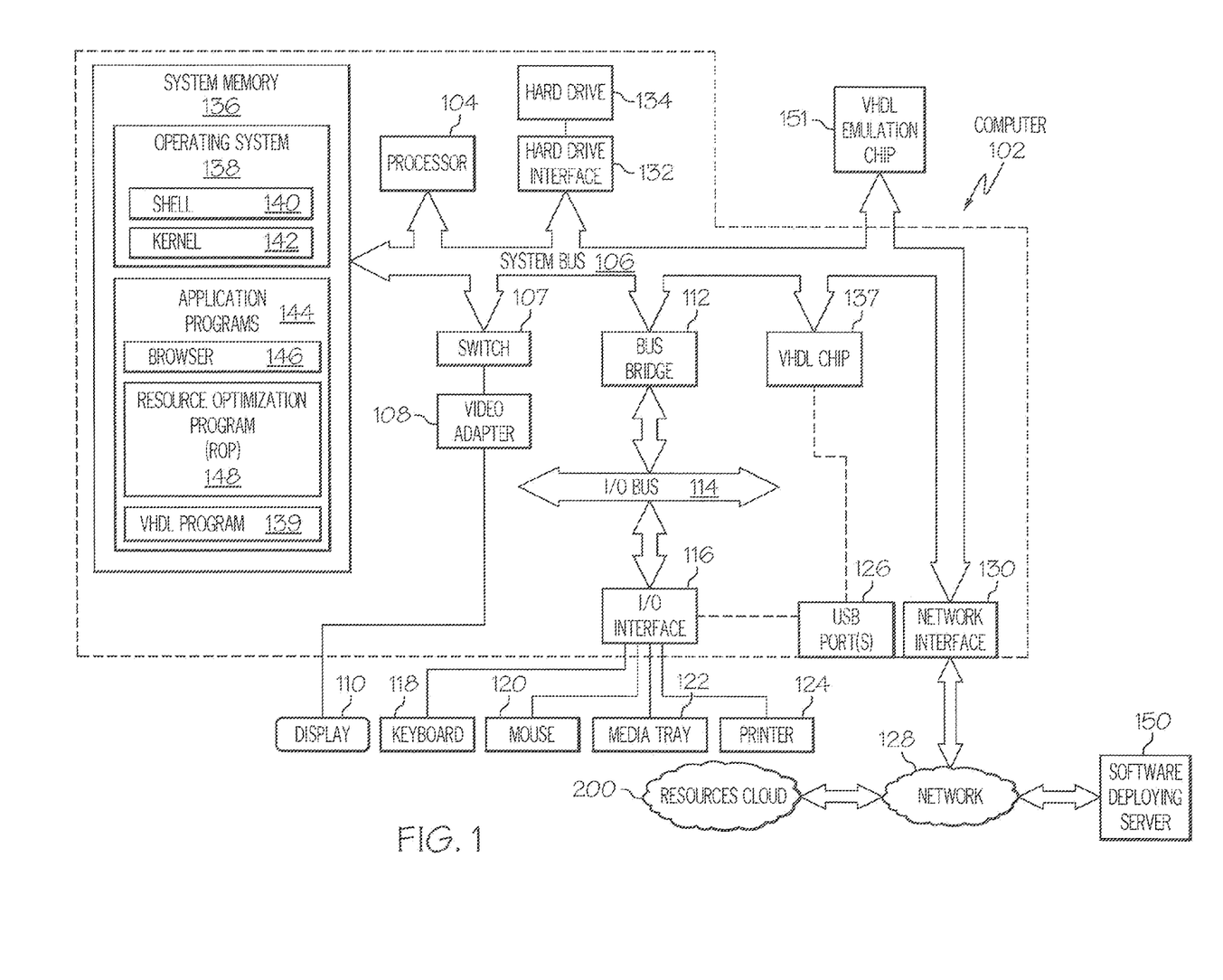
FIG. 1 depicts an exemplary computer in which the present disclosure may be implemented.

With reference now to the figures, and in particular to FIG. 1, there is depicted a block diagram of an exemplary computer 102, which may be utilized by the present disclosure. Note that some or all of the exemplary architecture, including both depicted hardware and software, shown for and within computer 102 may be utilized by software deploying server 150, as well as user computer 206, servers 208a-n and other computing resources depicted and described in FIG. 2.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., resource optimization program—ROP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150 via network 128 and a resources cloud 200 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a resource optimization program (ROP) 148. ROP 148 includes code for implementing the processes described below, including those described in FIGS. 2-3. In one embodiment, computer 102 is able to download ROP 148 from software deploying server 150, including in an on-demand basis, such that the code from ROP 148 is not downloaded until runtime or otherwise immediately needed by computer 102. Note further that, in one embodiment of the present disclosure, software deploying server 150 performs all of the functions associated with the present disclosure (including execution of ROP 148), thus freeing computer 102 from having to use its own internal computing resources to execute ROP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from ROP 148 causes VHDL program 139 to configure VHDL chip 137, which may be an FPGA, ASIC, etc.

In another embodiment of the present disclosure, execution of instructions from ROP 148 results in a utilization of VHDL program 139 to program a VHDL emulation chip 151. VHDL emulation chip 151 may incorporate a similar architecture as described above for VHDL chip 137. Once ROP 148 and VHDL program 139 program VHDL emulation chip 151, VHDL emulation chip 151 performs, as hardware, some or all functions described by one or more executions of some or all of the instructions found in ROP 148. That is, the VHDL emulation chip 151 is a hardware emulation of some or all of the software instructions found in ROP 148. In one embodiment, VHDL emulation chip 151 is a programmable read only memory (PROM) that, once burned in accordance with instructions from ROP 148 and VHDL program 139, is permanently transformed into a new circuitry that performs the functions needed to perform the process described below in FIGS. 2-3.

The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

Figure 2:
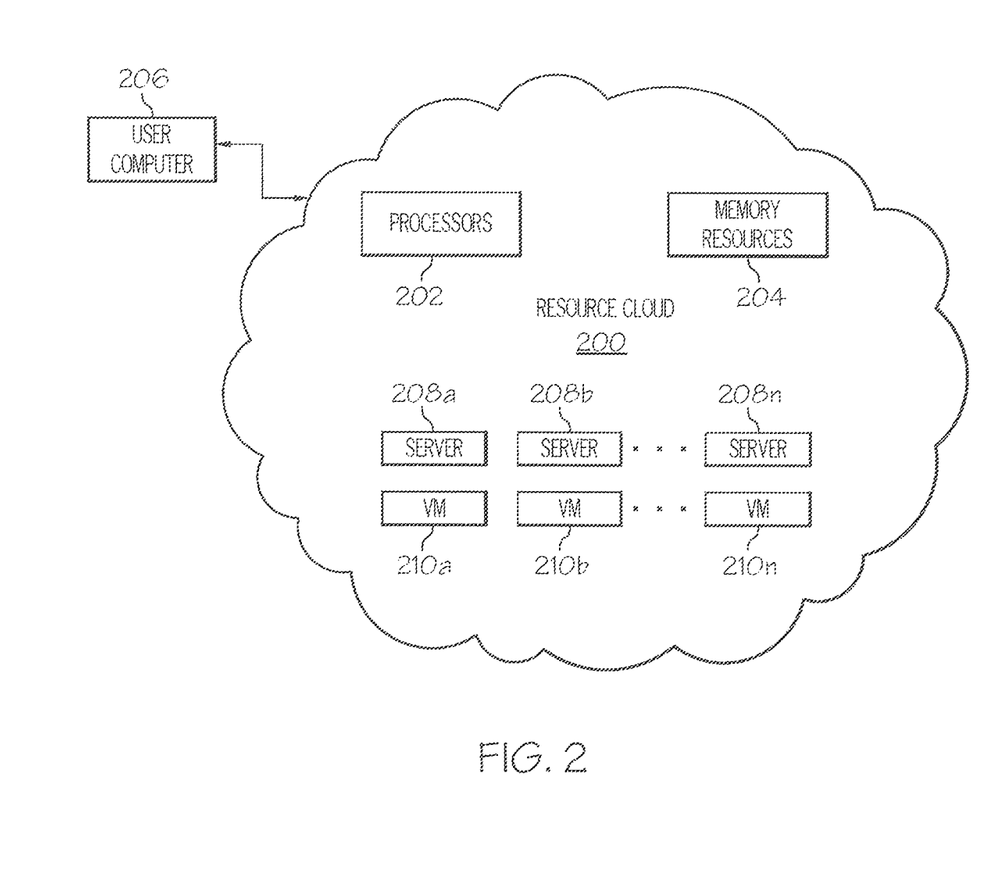
FIG. 2 illustrates an exemplary resources cloud as used in one embodiment of the present disclosure.

Capacity planning in a data center seeks server consolidation to minimize the number of physical servers required to run the applications/VMs with fluctuating workloads while ensuring SLA for the applications. In accordance with the present disclosure, shared resource pools are allocated in an optimized manner according to predicted future loads. As described herein, resources are allocated to an application and/or virtual machine (VM) based on past average workloads of the application. For example, as shown in FIG. 2, a resource cloud 200 comprises processors 202, memory resources 204 (comprising system memory and/or secondary mass storage memory), and other resources (e.g., operating systems, network connections, etc.) that are available for use by a user computer 206 to execute applications, either directly on servers (which comprise the processors 202, memory resources 204, etc.) or through the use of VM (which utilizes the processors 202, memory resources 204, etc.). Viewed another way, resource cloud 200 may comprise multiple servers (208*a-n*, where "n" is an integer), and/or multiple VMs (210*a-n*, where "n" is an integer). Thus, the present disclosure may be utilized to 1) minimize how many servers are required to execute an application or a set of applications (chromosome); 2) minimize how many VMs are required to execute an application or chromosome; or 3) how many servers are required to enable one or more VMs.

As described herein, while allocating the resources to applications/VMs on a server, steps are taken to ensure a fixed quantity of resources are allocated to the applications on the server, and that some amounts of resources are left as free resources on the server. The resource quantities to be left free on a server are algorithmically determined utilizing the methodology described below.

In one embodiment, the free resources on the server are used to address the variation in workload considering the application service level agreement (SLA). The application SLA is a level of ability/service that is contractually guaranteed by the provider of the application and/or its execution (i.e., the capacity of service-provided hardware on which the application is to run). Rather than consider just peak loads to provision the resources on servers, which results in over provisioning of resources, the present disclosure addresses the problem of resource allocation/reservation in a more realistic way (e.g., by utilizing the algorithms described below) to allocate certain a quantity of dedicated resources to applications, and to keep a predetermined quantity of free server resources for addressing workload fluctuations. The process described herein results in higher resource utilization and better packing of applications/VMs on servers while addressing the fluctuation of application resource requirements.

Algorithms used herein in one embodiment of the present disclosure are now presented and described.

Subscripts Used in the Algorithms

| | |
|---|---|
| i | Denotes a physical server |
| j | Denotes an application/VM |

Inputs
  N=Number of physical servers, i=1 to N
  K=Number of applications/VMs, j=1 to K
  $P_i$=Processor Capacity of Server i
  $M_i$=Memory Capacity of Server i
  $P_j(\xi)$=Processor requirement (random) variations for application j where $p_j$, $vp_j$ are average and standard deviations of processor usage by application j
  $mj(\xi)$=Memory requirement (random) variations for application j where $m_j$, $vm_j$ are average and standard deviations of memory usage by application j
  $SL_j$=Service level target of application j
  $\eta$=Confidence level desired by applications with respect to service level targets.
VM Self Management Resource Consumption
  Note that various advanced virtualization features monopolize the use of some amount of resources, and thus are not available for application usage.
  $sp_{ij}$=Processors consumed by application j on server i
  $sm_{ij}$=Memory consumed by application j on server i
Deterministic Variables
  $x_i$=Binary (0 or 1) variable representing the state of server i (0=server active 1=server shutdown)
  $y_{ij}$=Binary (0 or 1) variable representing the state of partition j on server i (0=partition active 1=partition doesn't exist)
  $fp_i$=Amount of processor capacity reserved in common pool of server i
  $fm_i$=Amount of memory reserved in common pool of server i
Random Variables
  $ep_i(\xi)$=Amount of excess quantity above processor capacity requested by applications deployed on server i
  $em_i(\xi)$=Amount of excess quantity above memory capacity requested by applications deployed on server i
  $up_i(\xi)$=Amount of unutilized processor capacity in server i
  $um_i(\xi)$=Amount of unutilized memory capacity in server i
  $sl_j(\xi)$=Service level of application/Objective
Objective Function
  Minimize the number of servers required to deploy all the application subject to the below constraints.
Constraints to be Solved
  Constraint (1): Processor capacity constraints of server i $$\sum_{j=1}^{K} (p_j(\xi) + sp_{ij}) * y_{ij} + up_i(\xi) - ep_i(\xi) = p_i$$

Constraint (2): The amount of processor capacity on a server to be reserved in the common pool is at least a factor of standard deviation of the processor workloads of "all" the applications deployed on the server.

$$fp_i \geq k * vp_{ij} * y_{ij} \forall i, \forall j$$

This constraint will help in addressing the SLA during various application workloads on the server.
  Constraint (3): Ensure that each deployed application onto a server gets a minimum amount of memory resources equal to the average memory consumption of the application.

$$\sum_{j=1}^{K} (p_j + sp_{ij}) * y_{ij} + fp_i = p_i \forall t$$

Constraint (4): Memory capacity constraints of server i $$\sum_{j=1}^{K} (m_j(\xi) + sm_{ij}) * y_{ij} + um_i(\xi) - em_i(\xi) = M_i \forall i$$

Constraint (5): The amount of memory capacity on a server to be reserved in the common pool is at least a factor of standard deviation of the memory workloads of all of the applications deployed on the server.

$$fm_i \geq k * vm_{ij} * y_{ij} \forall i, \forall j$$

Constraint (6): Ensure that each deployed application on to a server gets a minimum amount of processor resources equal to the average processor requirement of the application.

$$\sum_{j=1}^{K} (m_j + sm_{ij}) * y_{ij} + fm_i = M_i \forall i$$

Constraint (7): Application j of server i can be activated only if server i is running $$y_{ij} - x_i \leq 0 \forall i, j$$

Constraint (8): An application can be deployed on only one server $$\sum_{i=1}^{K} y_{ij} = 1 \forall j$$

Constraint (9): Application service level constraints. Service level achieved by an application should be greater than the service level targets with desired confidence level.

$$Pr\{sl_j(\xi) \geq SL_j\} \geq \eta$$

Genetic Algorithm Based Solution
  By utilizing solutions for the constraints describe/defined above, a combined genetic algorithm and Monte Carlo Simulation solves the above complex stochastic optimization problem.
  Packing algorithm used in a genetic algorithm (GA)—The first step in the GA used is to generate a sequence of applications and assigning them to servers. Applications are packed/assigned onto the server using the sequence generated by the GA. To assign the applications to the servers, the resource requirement of the workload as considered random compared to prior art deterministic models that use peak workloads to calculate capacity. Since resource requirements of workload result in a random number, the probability that the "total" future resource requirement from each of the workload deployed on the server is satisfied by the approach of allocating resources described herein. For example, the probability/confidence level (X) that this deployment meets the required SLA is 0.90 for each of the applications A1, A5, A9). This application SLA requirement is used as an input to determine the size of a common resource pool which is a factor (k) of combined variability of each of the applications chosen to be deployed on the server.

Validation and Scoring procedure used GA—In one embodiment, a Monte Carlo simulation (which relies on repeated random samplings to compute a result) is used to generate future resource requirements on each of the application. Hypothesis testing is used to test the solution by evaluating the fitness of the assignment (i.e., with what confidence level the deployment meets the application SLA requirements). Based on the generated future workloads on the applications, the sample's SLA statistics (mean, standard deviation) achieved by each of application on the server are calculated. Since the population standard deviation of the service levels of the application deployment may be unknown, the sample's standard deviation is used as an estimate of the population standard deviation of service level. In order to ensure that a deployment meets a population's mean service level of the deployment greater than or equal to the application's target SLA with a confidence level of X %, a one sided t-test is used to arrive at the lower bound for a sample's mean service level. The population mean SLA is derived and checked to determine if it is equal to or greater than the minimum required SLA for the given confidence level. If the population mean SLA satisfies this evaluation, the solution is deemed to be valid. Each valid solution is scored and either accepted or rejected before considering it for the next generation. The steps of the complete genetic algorithm are described below. For simplicity sake in the algorithm steps, application workloads on CPU and memory are just referenced as workloads. In one embodiment, the presently disclosed process arranges target servers in decreasing order of their capacities while deploying applications/VMs.

Figure 3:
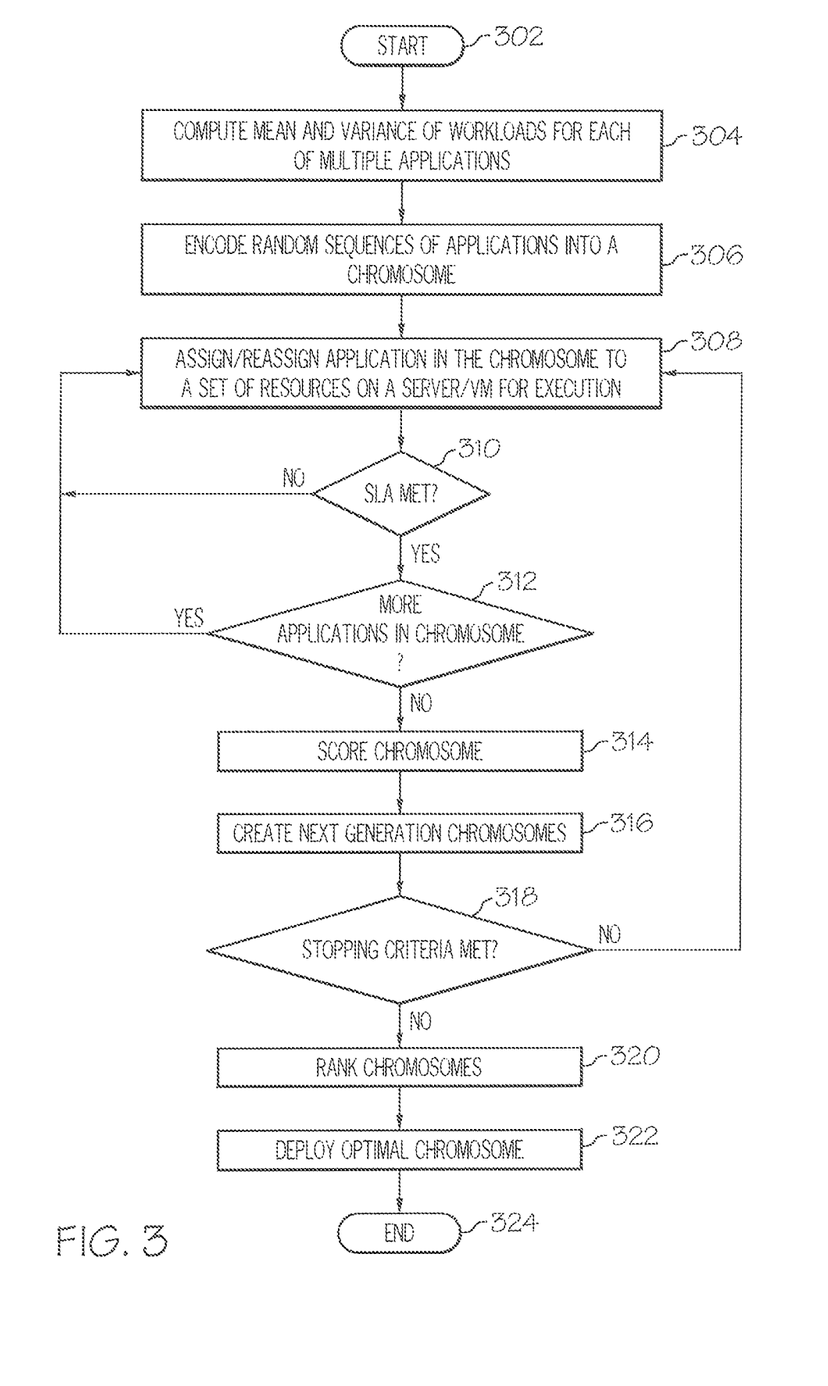
FIG. 3 is a high level flow chart of exemplary steps taken to optimize resource capacity planning.

With reference now to FIG. 3, a high-level flowchart of exemplary steps, some or all of which may be executed on a processor, for allocating resources in servers and/or VMs for workloads is presented. After initiator block 302, the mean and variance of workloads for each of multiple applications is computed (block 304). Using application workload statistics (e.g., CPU and memory usage) that have been captured for specifically identified applications over a period of time, the mean and variance of workloads for each application is computed. A probability distribution is fit for each of the application workloads. In one embodiment, based on the probability distribution observed from the captured data, the application workloads can be considered to be normally distributed.

As described in block 306, multiple applications, which have had their mean and variance of workloads computed, are randomly sequenced and encoded as a single chromosome. A chromosome is defined as and represents the random sequence of applications. The length of the chromosome is equal to the number of applications. Each gene in the chromosome represents a unique application, and is identified by that unique application's identifier (ID). Thus, each chromosome contains a list of all applications that have been encoded onto that chromosome. The process described in block 306 is repeatedly executed to generate a set of chromosomes. This set of chromosomes creates an initial population of chromosomes.

With reference now to block 308, an initial application from a selected chromosome is assigned to a set of resources on a server/VM for execution. Each application in the chromosome is selected in the same sequence that it appears in the chromosome. Utilizing using constraints (7) and (8) described above, application work load statistics from the captured utilization data (obtained in the process describe in block 304) and the following criteria, a server onto which the picked application can be deployed is located.

A server is selected from a used servers list. Initially, this used servers list is empty, and an unused servers list contains all available servers. A check is made to determine if resources on the server can be reserved, based on the average workload of the application and the free pool capacity on the server being greater than k (a constant) times the combined variance of deployed applications and the picked application. This determination is made by using the packing algorithm described above, which is formulated into constraints (1), (2), (3), (4), (5) and (6) listed above.

If the service level agreement (SLA) for that picked application is satisfied (query block 310), then the selected server is a potential server for deploying that application. A check is them made to ascertain whether the SLAs are achieved by this new deployment. Thus, using simulation of workloads (for already deployed applications on the server and the new application under consideration), and hypothesis testing a determination is made as to whether SLAs of applications are within the required SLA limits at a certain confidence level. The constraint (9) described above is used in the determination depicted in query block 310.

Exemplary calculations of the application SLA are performed in the following manner. If a sum of above average work loads of all deployed applications on the server and the new application is less than the server's common pool, then the service level is considered as 100%. If a sum of above average work loads of all deployed applications and the new application is greater than the server's common pool, then an assumption is made that the share of common pool resources used for the application during this workload is proportional to the common pool capacity of the server. The service level is then deemed to be the ratio of (reserved resources for the application+a proportion of common pool resource given to the application)/the workload of the application. From these steps, the average service level of the application is computed based on "all" (of the examined) simulated workloads of the application. Thus, if the SLA for the application is met while running on the resources selected, then a notation is made that the application can be deployed in the future on the server to which those resources are associated.

Note that if the selected resources do not meet the criteria established above for executing the application, then there is no deployment of that application to that server. Ira that case, then another server from the used server list is examined utilizing the SLA process just described. If there are no servers in the used server list to deploy the application, then a next server from the unused servers list is selected, and the process of examining SLA performance continues as described. The process of scoring the SLA performance for each application in a chromosome continues in a reiterative manner until there are no more applications in the chromosome to be evaluated (query block 312). At that point, the chromosome is validated and scored (block 314). The number of servers in the used server list is the score of the chromosome. A lower score is better than a higher score. For example, if the chromosome must use five servers/VMs to meet its SLA, five is deemed a better score than seven (in which another chromosome used seven servers/VMs to meet its SLA).

Next Generation Chromosomes

As described in block 316, a next generation chromosome is then generated from the initial chromosome that has just been evaluated. From the population of chromosomes in the current generation, two chromosomes are randomly picked (without chromosomes' replacement) for crossover and mutation operations. Crossover occurs when two chromosomes exchange one or more applications; mutation occurs when a single chromosome switches the positioning of two or more applications within that same single chromosome. Each of the new chromosomes (two from crossover and two from mutation) are scored, and the best two chromosomes (from all six) are selected and put in the next generation chromosomes list. This step continues until there are no unchanged chromosomes in the list.

Stopping Criteria

As depicted in query block 318, the process continues in a reiterative manner using next generation chromosomes until a certain user defined number of generations are reached. In the final generation, the chromosomes (i.e., all next generation chromosomes) are rank ordered based on the chromosomes' score (block 320), and a solution that has the best score is selected. The genetic algorithm solution presents the number of target servers and the mapping of applications/VMs to each of those target servers. As described in block 322, the chromosome (from the first and next generation chromosomes) that has the best score (utilizes the fewest resources, such as servers, VMs, processors, memory, etc.) is then deployed. The process ends at terminator block 324.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the disclosure of the present application in detail and by reference to illustrative embodiments thereof, it will be apparent that modifications and variations are possible without departing from the scope of the disclosure defined in the appended claims.

What is claimed is:

1. A computer implemented method, executing on hardware, of capacity planning of resources by utilizing a stochastic analysis of application workloads, the computer implemented method comprising:
   computing an average workload of each of multiple applications, wherein the average workload describes an average past usage of computing resources by each of the multiple applications;
   encoding a random sequence of the multiple applications into a first generation chromosome, wherein the first generation chromosome is a random first sequence of the multiple applications;
   executing the first generation chromosome using a first set of computing resources in a resource cloud;
   in response to execution of the first generation chromosome on the first set of computing resources meeting a predetermined service level agreement (SLA) for the first generation chromosome, scoring the first generation chromosome in accordance with how many computing resources within the first set of computing resources are utilized in order to meet the predetermined SLA;
   generating at least one next generation chromosome from the first generation chromosome, wherein the next generation chromosome is a random second sequence of the multiple applications;
   executing and scoring next generation chromosomes; and
   deploying an optimal chromosome, wherein the optimal chromosome is a chromosome identified from the first and next generation chromosomes that utilizes a fewest amount of computing resources in the resource cloud.

2. The computer implemented method of claim 1, wherein the computing resources comprise servers, and wherein the scoring is based on how many servers are used during execution of a chromosome.

3. The computer implemented method of claim 1, wherein the computing resources comprise virtual machines, and wherein the scoring is based how many virtual machines are used during execution of a chromosome.

4. The computer implemented method of claim 1, wherein the computing resources comprise processors, and wherein the scoring is based on how many processors are used during execution of a chromosome.

5. The computer implemented method of claim 1, wherein the computing resources comprise system memory, and wherein the scoring is based on how much system memory is used during execution of a chromosome.

6. The computer implemented method of claim 1, wherein the computing resources comprise secondary storage memory, and wherein the scoring is based on how much secondary storage memory is used during execution of a chromosome.

7. The computer implemented method of claim 1, wherein the next generation chromosomes are generated by switching positions of at least two applications within the first generation chromosome.

8. The computer implemented method of claim 1, wherein the next generation chromosomes are generated by switching at least two applications between different chromosomes.

9. The computer implemented method of claim 1, further comprising:
reserving a free pool of resources for executing the chromosome, wherein a size of the free pool of resources is determined by the predetermined SLA and the average workload of each of the multiple applications.

10. A computer program product comprising a non-transitory computer readable storage medium embodied therewith, the non-transitory computer readable storage medium comprising:
computer readable program code configured to compute an average workload of each of multiple applications, wherein the average workload describes past usage of computing resources by each of the multiple applications;
computer readable program code configured to encode a random sequence of the multiple applications into a first generation chromosome;
computer readable program code configured to execute the first generation chromosome using a first set of computing resources in a resource cloud;
computer readable program code configured to, in response to execution of the first generation chromosome on the first set of computing resources meeting a predetermined service level agreement (SLA) for the first generation chromosome, score the first generation chromosome in accordance with how many computing resources within the first set of computing resources are utilized in order to meet the predetermined SLA;
computer readable program code configured to generate at least one next generation chromosome from the first generation chromosome;
computer readable program code configured to execute and score next generation chromosomes; and
computer readable program code configured to deploy an optimal chromosome, wherein the optimal chromosome is a chromosome from the first and next generation chromosomes that utilizes a fewest amount of computing resources in the resource cloud.

11. The computer program product of claim 10, wherein the computing resources comprise virtual machines, and wherein the scoring is based how many virtual machines are used during execution of a chromosome.

12. The computer program product of claim 10, wherein the computing resources comprise processors, and wherein the scoring is based on how many processors are used during execution of a chromosome.

13. The computer program product of claim 10, wherein the computing resources comprise system memory, and wherein the scoring is based on how much system memory is used during execution of a chromosome.

14. The computer program product of claim 10, wherein the computing resources comprise secondary storage memory, and wherein the scoring is based on how much secondary storage memory is used during execution of a chromosome.

15. A computer hardware system comprising:
a central processing unit; and
a computer readable memory coupled to the central processing unit, wherein the computer readable memory comprises software that, when executed, causes the central processing unit to implement:
computing an average workload of each of multiple applications, wherein the average workload describes past usage of computing resources by each of the multiple applications;
encoding a random sequence of the multiple applications into a first generation chromosome;
executing the first generation chromosome using a first set of computing resources in a resource cloud;
in response to execution of the first generation chromosome on the first set of computing resources meeting a predetermined service level agreement (SLA) for the first generation chromosome, scoring the first generation chromosome in accordance with how many computing resources within the first set of computing resources are utilized in order to meet the predetermined SLA;
generating at least one next generation chromosome from the first generation chromosome;
executing and scoring next generation chromosomes; and
deploying an optimal chromosome, wherein the optimal chromosome is a chromosome from the first and next generation chromosomes that utilize utilizes a fewest amount of computing resources in the resource cloud.

16. The computer system of claim 15, wherein the computing resources comprise servers, and wherein the scoring is based on how many servers are used during execution of a chromosome.

17. The computer system of claim 15, wherein the computing resources comprise virtual machines, and wherein the scoring is based how many virtual machines are used during execution of a chromosome.

18. The computer system of claim 15, wherein the computing resources comprise processors, and wherein the scoring is based on how many processors are used during execution of a chromosome.

19. The computer system of claim 15, wherein the next generation chromosomes are generated by switching positions of at least two applications within the first generation chromosome.

20. The computer system of claim 15, wherein the next generation chromosomes are generated by switching at least two applications between different chromosomes.

* * * * *